(12) United States Patent
Stocco (10) Patent No.: US 10,247,278 B2
(45) Date of Patent: Apr. 2, 2019

(54) HYBRID ORBITLESS GEARBOX

(71) Applicant: Leo J. Stocco, Vancouver (CA)

(72) Inventor: Leo J. Stocco, Vancouver (CA)

(73) Assignee: Orbitless Drives Inc, Vancouver (CA)

( * ) Notice: Subject to any disclaimer, the term of this patent is extended or adjusted under 35 U.S.C. 154(b) by 38 days.

(21) Appl. No.: 15/511,214

(22) PCT Filed: Sep. 8, 2015

(86) PCT No.: PCT/CA2015/050861
§ 371 (c)(1),
(2) Date: Mar. 14, 2017

(87) PCT Pub. No.: WO2016/037271
PCT Pub. Date: Mar. 17, 2016

(65) Prior Publication Data
US 2017/0292589 A1    Oct. 12, 2017

Related U.S. Application Data

(60) Provisional application No. 62/048,776, filed on Sep. 10, 2014.

(51) Int. Cl.
| | | |
|---|---|---|
| *F16H 1/20* | (2006.01) | |
| *F16H 1/02* | (2006.01) | |
| *F16H 57/02* | (2012.01) | |
| *F16H 57/023* | (2012.01) | |

(52) U.S. Cl.
CPC ............. *F16H 1/20* (2013.01); *F16H 1/02* (2013.01); *F16H 57/02* (2013.01); *F16H 57/023* (2013.01); *F16H 2057/02039* (2013.01)

(58) Field of Classification Search
CPC ... F16H 1/02; F16H 1/20; F16H 57/02; F16H 57/023; F16H 2057/02039
USPC ................................................... 475/331, 338
See application file for complete search history.

(56) References Cited

U.S. PATENT DOCUMENTS

| | | | |
|---|---|---|---|
| 2,950,635 A * | 8/1960 | Bieger | F16H 3/02 310/99 |
| 4,762,025 A | 8/1988 | Lew | |
| 4,896,567 A | 1/1990 | Zhou | |
| 5,544,539 A | 8/1996 | Spridco et al. | |
| 7,794,355 B2 * | 9/2010 | Pusateri | B25B 21/00 173/216 |

(Continued)

FOREIGN PATENT DOCUMENTS

| | | |
|---|---|---|
| CN | 103453117 A | 12/2013 |
| CN | 103477118 A | 12/2013 |

(Continued)

*Primary Examiner* — Leslie A Nicholson, III
(74) *Attorney, Agent, or Firm* — Banner & Witcoff, Ltd.

(57) ABSTRACT

A Hybrid Orbitless gearbox combines the high speed capabilities of an Orbitless first stage with the high ratio of a Coupled Orbitless second stage. The two stages share a common set of carriers and offset members for high compactness and simplicity. A Coupled Orbitless second stage may also function on its own. Its all-pinion design supports a variety of engaging members that include gears, chains, sprockets, belts, cables and pulleys, among others. Stepped engaging members further amplify the reduction ratio and variable pitch diameter engaging members provide an infinitely variable transmission ratio.

20 Claims, 8 Drawing Sheets

(56) References Cited

U.S. PATENT DOCUMENTS

| | | | |
|---|---|---|---|
| 8,251,860 B2* | 8/2012 | Lee | F16H 57/08 |
| | | | 475/183 |
| 2006/0205557 A1 | 9/2006 | Arndt et al. | |
| 2008/0220929 A1* | 9/2008 | Gebhardt | B60K 25/02 |
| | | | 475/331 |
| 2008/0261743 A1 | 10/2008 | Junkers | |
| 2010/0072725 A1 | 3/2010 | Woellhaf et al. | |
| 2011/0243740 A1* | 10/2011 | Siegfriedsen | F16H 1/48 |
| | | | 416/170 R |
| 2012/0270695 A1* | 10/2012 | Wells | A01D 69/06 |
| | | | 475/286 |
| 2014/0018203 A1 | 1/2014 | Huang et al. | |
| 2014/0200109 A1 | 7/2014 | Stocco | |
| 2014/0315679 A1* | 10/2014 | Xu | F16H 57/08 |
| | | | 475/331 |

FOREIGN PATENT DOCUMENTS

| | | | |
|---|---|---|---|
| EP | 0300108 | A2 | 1/1989 |
| FR | 1053098 | A | 1/1954 |
| GB | 2221278 | A | 1/1990 |

* cited by examiner

HYBRID ORBITLESS GEARBOX

REFERENCE TO EARLIER FILED APPLICATIONS

This application claims priority to U.S. Provisional Application No. U.S. 62/048,776 filed Sep. 10, 2014. This patent application is incorporated herein entirely by reference. This application improves upon International Application No. PCT/CA2015/050423 filed May 11, 2015 which discloses an Orbitless gearbox.

TECHNICAL FIELD

The disclosure herein relates to a gearbox comprising a plurality of gears or other engaging members. More particularly, it relates to an apparatus providing a drive member that rotates at a different rate as a driven member.

BACKGROUND

An Orbitless gearbox comprises a central gear and a number of offset crankshaft pinions, carried by a pair of offset carriers. It has lower pitch velocity, bearing speed, and windage than a Planetary gearbox but produces a lower speed ratio. It is, therefore, more energy efficient, but requires a greater volume for a given speed ratio.

A Coupled Orbitless gearbox comprises coupling members which engage the central and offset members whereby they rotate in a common direction. This amplifies and inverts the speed ratio so that the roles of the input and output members are interchanged.

Since the carriers are the output of an Orbitless reduction gearbox and the input of a Coupled Orbitless reduction gearbox, integrating an Orbitless first stage with a Coupled Orbitless second stage, allows a common set of carriers and offset members to be shared by both stages. A Hybrid Orbitless gearbox combines the superior efficiency and high-speed characteristics of an Orbitless gearbox with the high reduction ratio of a Coupled Orbitless gearbox.

SUMMARY

Certain exemplary embodiments comprise a reference member, a first and second carrier, a second central member, one or more offset members, one or more coupling members, and a number of coupling axes equal to the number of coupling members. The second central member and all offset and coupling members are engaging members. The reference member comprises a central axis and a first and second carrier axis. Each carrier comprises a rotation axis and a number of offset axes equal to the number of offset members. Each offset member comprises a first and second member axis. All axes are parallel. The first and second carrier axes and all associated first and second member axes are spaced apart by the carrier distance. Each offset axis and the associated rotation axis are spaced apart by an offset distance. All offset axes are arranged circumferentially around the associated rotation axis. The second central member and the central axis, the first rotation axis and the first carrier axis, the second rotation axis and the second carrier axis, each first member axis and a different first offset axis, each second member axis and a different second offset axis, and each coupling member and a different coupling axis, are co-axial and rotatably coupled. The coupling axes are arranged whereby the coupling members simultaneously engage the second central member and all offset members.

Certain exemplary embodiments further comprise a first central member which is an engaging member which is co-axial and rotatably coupled with the central axis.

In certain exemplary embodiments, the first central member simultaneously engages all offset members.

In certain exemplary embodiments, the first central member simultaneously engages all coupling members.

In certain exemplary embodiments, each offset member is a stepped engaging member.

In certain exemplary embodiments, each coupling member is a stepped engaging member.

In certain exemplary embodiments, one of the first or second carriers and all coupling axes are integral. The associated carrier axis and the central axis are co-axial.

Certain exemplary embodiments further comprise a third carrier comprising a third rotation axis. The third carrier and all coupling axes are integral. The third rotation axis and the central axis are co-axial and rotatably coupled.

Certain exemplary embodiments further comprise a variable speed ratio between the second central member and the offset members.

Certain exemplary embodiments comprise a reference member, a first and second carrier, a first and second central member, one or more offset members, and one or more coupling members. The first and second central member and all offset and coupling members are engaging members. The reference member comprises a central axis and a first and second carrier axis. Each carrier comprises a rotation axis and a number of offset axes equal to the number of offset members. Each offset member comprises a first and second member axis. All axes are parallel. The first and second carrier axes and all associated first and second member axes are spaced apart by the carrier distance. Each offset axis and the associated rotation axis are spaced apart by an offset distance. All offset axes are arranged circumferentially around the associated rotation axis. The first central member and the central axis, the second central member and the central axis, the first rotation axis and the first carrier axis, the second rotation axis and the second carrier axis, each first member axis and a different first offset axis, and each second member axis and a different second offset axis, are co-axial and rotatably coupled. The first central member simultaneously engages all offset members. The coupling members simultaneously engage the second central member and all offset members.

In certain exemplary embodiments, each coupling member is a stepped engaging member.

Certain exemplary embodiments further comprise a variable speed ratio between the second central member and the offset members.

In certain exemplary embodiments, a reference member, a first and second carrier, a first and second central member, one or more offset members, and one or more coupling members are provided. The first and second central members and all offset and coupling members are provided with an engaging means. The reference member is provided with a central axis and a first and second carrier axis. Each carrier is provided with a rotation axis and a number of offset axes equal to the number of offset members. Each offset member is provided with a first and second member axis. All axes are located whereby they are all parallel. The first and second carrier axes and all associated first and second member axes are spaced apart by the carrier distance. Each offset axis and the associated rotation axis are spaced apart by an offset distance. All offset axes are arranged circumferentially around the associated rotation axis. The first central member and the central axis, the second central member and the central axis, the first rotation axis and first carrier axis, the second rotation axis and second carrier axis, each first member axis and a different first offset axis, and each second member axis and a different second offset axis, are co-axially located and rotatably coupled. The coupling members are simultaneously engaged with the second central member and all offset members.

In certain exemplary embodiments, the first central member is simultaneously engaged with all offset members.

In certain exemplary embodiments, the first central member is simultaneously engaged with all coupling members.

In certain exemplary embodiments, each offset member is provided with a first engaging step and a second engaging step.

In certain exemplary embodiments, each coupling member is provided with a first engaging step and a second engaging step.

In certain exemplary embodiments, one of the first or second carriers is provided with a number of coupling axes equal to the number of coupling members. Each coupling member and a different coupling axis are co-axially located and rotatably coupled. The associated carrier axis and the central axis are co-axially located.

In certain exemplary embodiments, a third carrier is provided which is provided with a third rotation axis and a number of coupling axes equal to the number of coupling members. Each coupling member and a different coupling axis, and the third rotation axis and the central axis, are co-axially located and rotatably coupled.

In certain exemplary embodiments, a variable speed ratio is provided between the second central member and the offset members.

REFERENCE NUMERALS 0-central axis
1-first carrier axis
2-second carrier axis
3-first rotation axis
4-second rotation axis
5-third rotation axis
6-first offset axis
7-second offset axis
8-first member axis
9-second member axis
10-coupling axis
11-first drive-shaft
12-second drive-shaft
13-first shaft
14-second shaft
15-coupling shaft
21-first carrier
22-second carrier
23-third carrier
30-reference member
31-first central member
32-second central member
33-offset member
34-coupling member
40-carrier distance
41-offset distance
42-coupling distance
51-first stage
52-second stage
53-front
54-rear

DEFINITIONS

A gear, sprocket, chain, pulley, belt, cable, friction or magnetic coupling, or any other member that engages and transmits energy to a mate is defined as an engaging member.

An engaging member that engages and transmits energy between two or more engaging members is defined as a coupling member.

A chain, belt, cable, or any other coupling member that changes shape while transmitting energy is defined as a flexible coupling member.

A flexible coupling member that simultaneously couples three or more engaging members is defined as a serpentine coupling member.

A flexible coupling comprising two counter-acting, preloaded cables that are fixedly attached to two pulleys is defined as a capstan cable coupling.

An engaging member that engages on its exterior surface is defined as a pinion.

An engaging member that engages on its interior surface is defined as a ring.

A member that is coupled to an axis by three or more encircling engaging members but by no other mechanical means is defined as floating.

Two parallel, offset shafts integrated into a common member is defined as a crankshaft.

An apparatus that scales the relative speed and torque of a drive and driven member is defined as a gearbox, whether or not it comprises any gears.

A gearbox that reduces velocity and amplifies torque is defined as a reduction gearbox.

A gearbox that amplifies velocity and reduces torque is defined as an overdrive gearbox.

A gearbox that may function as either a reduction or an overdrive gearbox is defined as back-drivable.

A gearbox comprising a reference member, two offset carriers, a central member and one or more crankshaft offset members is defined as an Orbitless gearbox.

An Orbitless gearbox further comprising one or more coupling members is defined as a Coupled Orbitless gearbox.

A gearbox which integrates two or more Orbitless and/or Coupled Orbitless gearboxes with a common set of carriers is defined as a Hybrid Orbitless gearbox.

DESCRIPTION OF EMBODIMENTS

Wherever possible, the same reference numerals are used throughout the accompanying drawings and descriptions to refer to the same or similar parts. Components such as bearings, retainers and fasteners that do not substantially contribute to the understanding of the invention are neglected for the sake of simplicity.

Although spur gears, pulleys, belts and cables are depicted in the accompanying drawings, it is understood that many other engaging means would suffice, such as conical, radial, offset, spiral, helical, double helical, herring-bone, or roller tooth gears, friction or magnetic couplings, and chain drives. It is also understood that associated gears may comprise any face width, tooth profile, pressure angle, or module and may be made from metal, plastic, or any other appropriate material.

Although a male shaft and female race are used to depict a rotatable coupling in the accompanying drawings, it is understood that any other means will suffice, such as anti-friction bearings, bushings, or low friction coatings, materials, surface treatments or lubricants. It is also understood that the male and female members of a rotatable coupling may often be interchanged.

Although a shaft is used to depict a drive or driven member in the accompanying drawings, it is understood that any other means will suffice, such as an engaging member, a keyed, splined, or threaded hole, or a magnetic or electrostatic coupling.

Although three or four offset members 33 are depicted in certain accompanying drawings, it is understood that any number of offset members 33 may be included, as long as they do not mechanically interfere.

Although two stages are depicted sharing a common set of carriers in certain accompanying drawings, it is understood that any number of stages may be included, as long as they do not mechanically interfere.

It is understood that multiple gearboxes may be joined in series or in parallel or combined with any other type of gearbox to provide a desired speed ratio or other characteristic.

It is understood that a back-drivable gearbox may provide either a reduction or an overdrive ratio by interchanging the roles of its drive and driven members. In fact, the roles of the reference member, drive member and driven member may all be interchanged to obtain a desired speed ratio, or to cause the drive and driven members to rotate in the same or opposite directions. Similarly, if any one is used as a drive member and the remaining two are used as driven members, a differential mechanism is obtained. Reduction, overdrive, differential, and reverse gearboxes are all contemplated.

It is understood that any one of the reference member 30, the first central member 31, the second central member 32, an offset member 33, a coupling member 34, or the first, second, or third carrier 21, 22, 23, may act as the reference with any other member acting as the drive or driven member.

Although certain exemplary embodiments depict the first drive-shaft 11 and the first or second carrier 21, 22 as integral, all carriers 21, 22, 23 rotate in unison so the first drive-shaft 11 could be integral with any of the first, second or third carriers 21, 22, 23.

It is understood that the individual offset members 33 may have non-uniform first and second member axes 8, 9 as long as the associated first and second offset axes 6, 7 are similarly non-uniform, although additional vibration may result.

Although certain exemplary embodiments depict all offset axes 6, 7 as being circumferentially equally spaced around the associated rotation axis 3, 4, it is understood that they may be unequally spaced, although additional vibration may result.

Although certain exemplary embodiments depict a first, second or third carrier 21, 22, 23, that is rotatably coupled about its center, it is understood that rotational coupling could be provided between the interior of the case 30 and the exterior of the associated carrier 21, 22, 23. Alternatively, a first, second or third carrier 21, 22, 23, that is rotatably coupled to the central axis 0, may be a floating carrier which is not explicitly coupled to the case 30. Similarly, the first or second central member 31, 32, may be floating members.

A representative sample of embodiments is included in the accompanying drawings for exemplary purposes only. A great number of kinematic arrangements, types of engaging members, and combinations of disclosed features are also contemplated. The scope of the present invention is not limited to the embodiments included but spans all possible combinations anticipated by the specification and claims.

FIGS. 1A-1F illustrate a first exemplary embodiment of the present invention providing a reduction ratio between a first drive-shaft 11 and a second drive-shaft 12.

The first exemplary embodiment comprises a reference member 30, a first carrier 21, a second carrier 22, a first central member 31, a second central member 32, three offset members 33, and three coupling members 34.

The reference member 30 acts as the case of the gearbox and comprises a central axis 0, a first carrier axis 1, and a second carrier axis 2, all of which are parallel. The first carrier axis 1 and the central axis 0 are co-axial. The second carrier axis 2 and the central axis 0 are spaced apart by a carrier distance 40.

The first carrier 21 comprises a first rotation axis 3, three first offset axes 6, and three coupling axes 10. All first offset axes 6 are circumferentially equally spaced. Each first offset axis 6 and the first rotation axis 3 are spaced apart by an offset distance 41. All coupling axes 10 are circumferentially equally spaced. Each coupling axis 10 and the first rotation axis 3 are spaced apart by a coupling distance 42.

The second carrier 22 comprises a second rotation axis 4 and three second offset axes 7. All second offset axes 7 are circumferentially equally spaced. Each second offset axis 7 and the second rotation axis 4 are spaced apart by the offset distance 41.

The first rotation axis 3 and the first carrier axis 1 are co-axial and rotatably coupled. The second rotation axis 4 and the second carrier axis 2 are co-axial and rotatably coupled.

Each offset member 33 comprises a co-axial first shaft 13 defining a first member axis 8, and an offset second shaft 14 defining a second member axis 9, which are parallel, spaced apart by the carrier distance 40, and together define a crankshaft. Each coupling member 34 comprises a co-axial coupling shaft 15.

Each first member axis 8 and a different first offset axis 6 are co-axial and rotatably coupled. Each second member axis 9 and a different second offset axis 7 are co-axial and rotatably coupled. Each coupling shaft 15 and a different coupling axis 10 are co-axial and rotatably coupled.

The first central member 31 and first drive-shaft 11 are co-axial and integral. The second central member 32 and second drive-shaft 12 are co-axial and integral. The first central member 31 and the central axis 0 are co-axial and rotatably coupled. The second central member 32 and the central axis 0 are co-axial and rotatably coupled.

The first central member 31, second central member 32, all offset members 33, and all coupling members 34 are pinion gears. The first central member 31 simultaneously engages all offset members 33. Each coupling member 34 simultaneously engages the second central member 32 and a different offset member 33. Together, the coupling members 34 co-operate to simultaneously engage the second central member 32 and all offset members 33.

The first central member 31, all offset members 33, and the carriers 21, 22, together define a first stage 51 which is an Orbitless gearbox. The second central member 32, all offset members 33, all coupling members 34, and the carriers 21, 22, together define a second stage 52 which is a Coupled Orbitless gearbox. The offset members 33 and carriers 21, 22 are shared by the first and second stages 51, 52, which together define a Hybrid Orbitless gearbox.

Figure 1A:
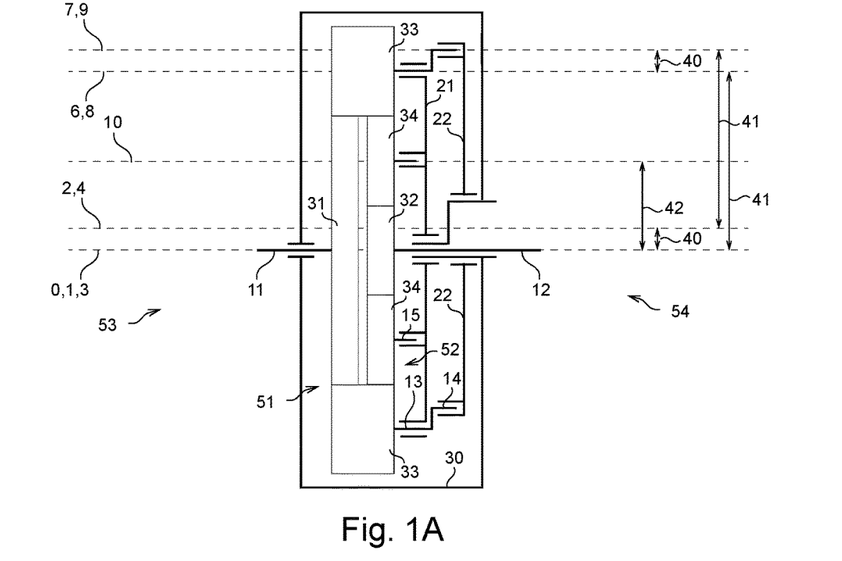
FIGS. 1A-1D are respectively, a schematic side view, two partial front views, and an exploded perspective view, in accordance with a first exemplary embodiment depicting the present invention comprising gear engaging members.
Figure 1B:
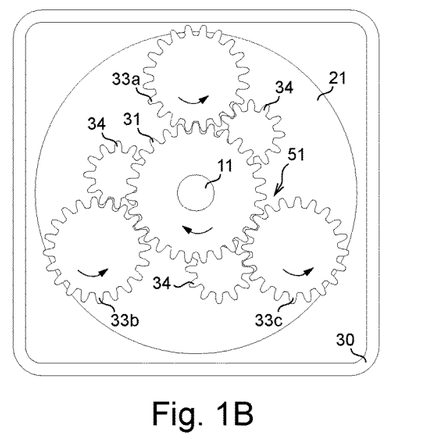
Figure 1C:
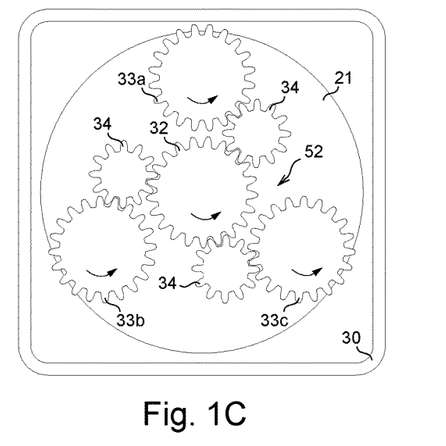
Figure 1D:
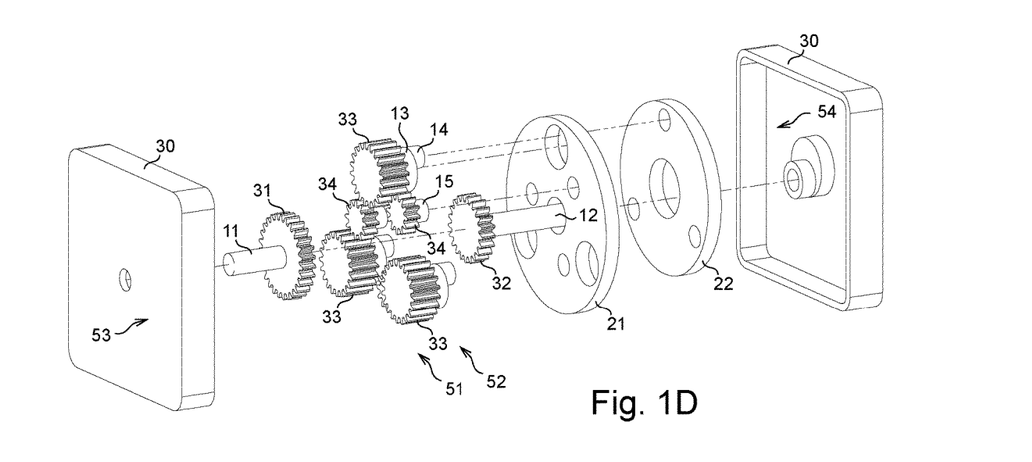
Figure 1E:
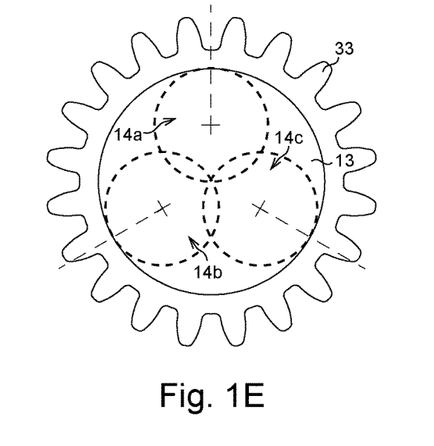
FIGS. 1E-1F are respectively a rear view of an offset member, and a perspective view of an engaged offset and coupling member, in accordance with the first exemplary embodiment of the present invention.

FIG. 1E illustrates non-uniform placement of the second shafts 14a-14c on the associated offset members 33a-33c that is required for the first exemplary embodiment to be assemble-able. The requirement for non-uniform second shaft 14 placement depends on the particular pitch diameters and spacing of the associated engaging members.

Figure 1F:
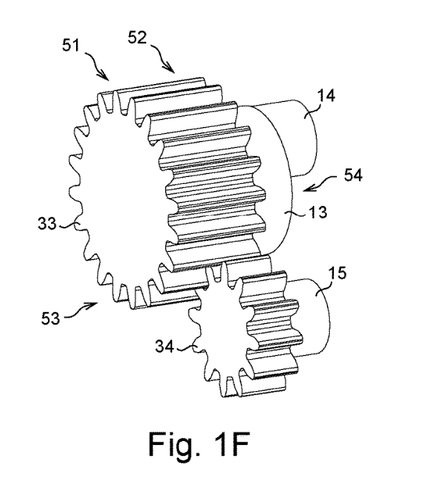

FIG. 1F illustrates a detail view of an offset member 33 and an engaged coupling member 34. The offset member 33 has a large face width, a portion of which is engaged by the first stage 51, and a portion of which is engaged by the second stage 52.

Figure 2:
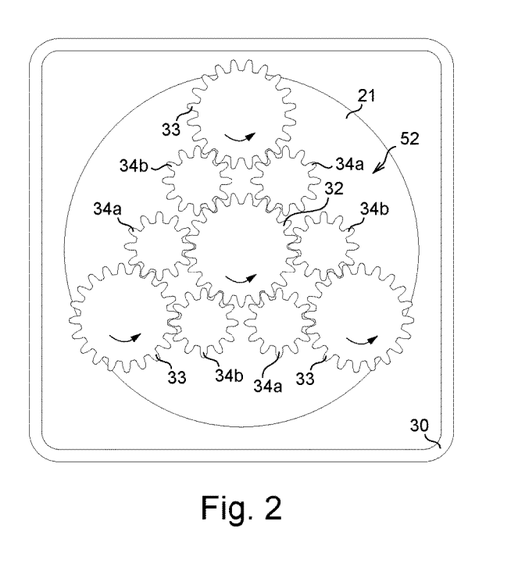
FIG. 2 is a partial front view in accordance with a second exemplary embodiment depicting the present invention comprising two coupling members engaging each offset member.

FIG. 2 illustrates a second exemplary embodiment of the present invention which is similar to the first exemplary embodiment except two redundant coupling members 34a, 34b simultaneously engage the second central member 32 and each offset member 33. Both coupling members 34a, 34b are depicted with uniform pitch diameters. If the coupling members 34a, 34b are non-uniform, non-uniform coupling distances 42 are required for the associated coupling members 34a, 34b.

Figure 3A:
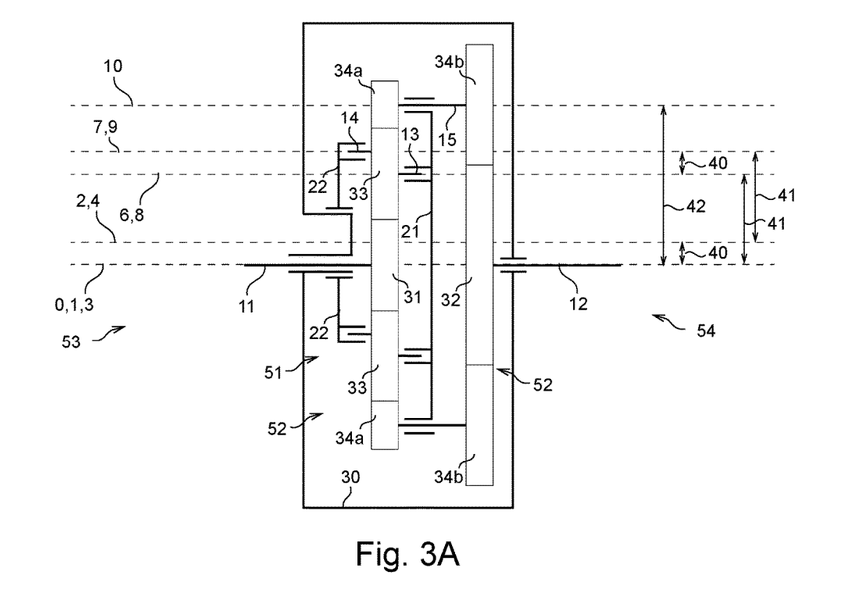
FIGS. 3A-3B are respectively, a schematic side view and an exploded perspective view, in accordance with a third exemplary embodiment depicting the present invention comprising stepped coupling members.
Figure 3B:
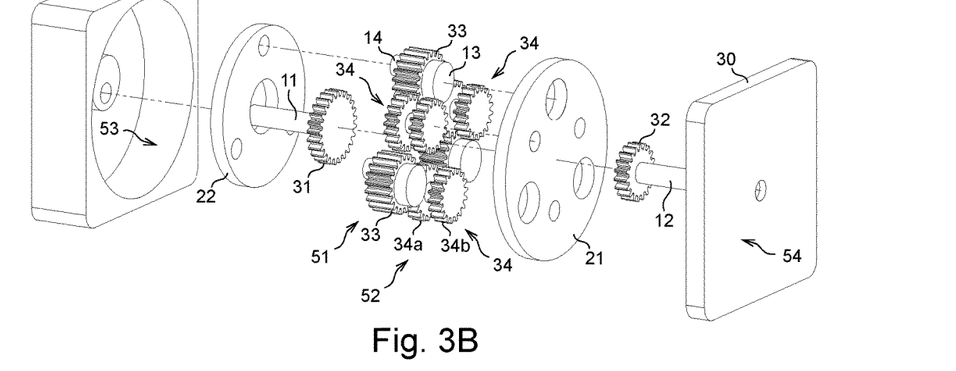

FIGS. 3A-3B illustrate a third exemplary embodiment of the present invention which is similar to the first exemplary embodiment except each coupling member 34 is a stepped coupling member comprising a first step 34a, and a second step 34b. An offset member 33 engages each first step 34a and the second central member 32 simultaneously engages all second steps 34b. In addition, the second carrier 22 is located in front of the offset members 33 and the second central member 32 is located behind the first carrier 21, which is a floating carrier.

Figure 4:
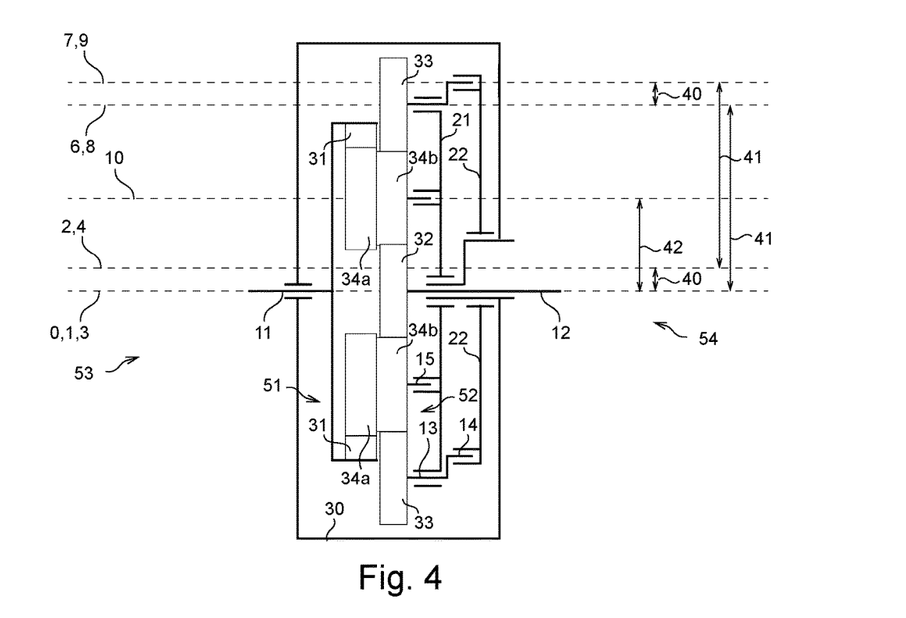
FIG. 4 is a schematic side view in accordance with a fourth exemplary embodiment depicting the present invention comprising a ring first central member engaging stepped coupling members.

FIG. 4 illustrates a fourth exemplary embodiment of the present invention which is similar to the first exemplary embodiment except each coupling member 34 is a stepped coupling member comprising a first step 34a and a second step 34b. The first central member 31 is a ring which simultaneously engages all first steps 34a and each second step 34b simultaneously engages the second central member 32 and an offset member 33.

Figure 5:
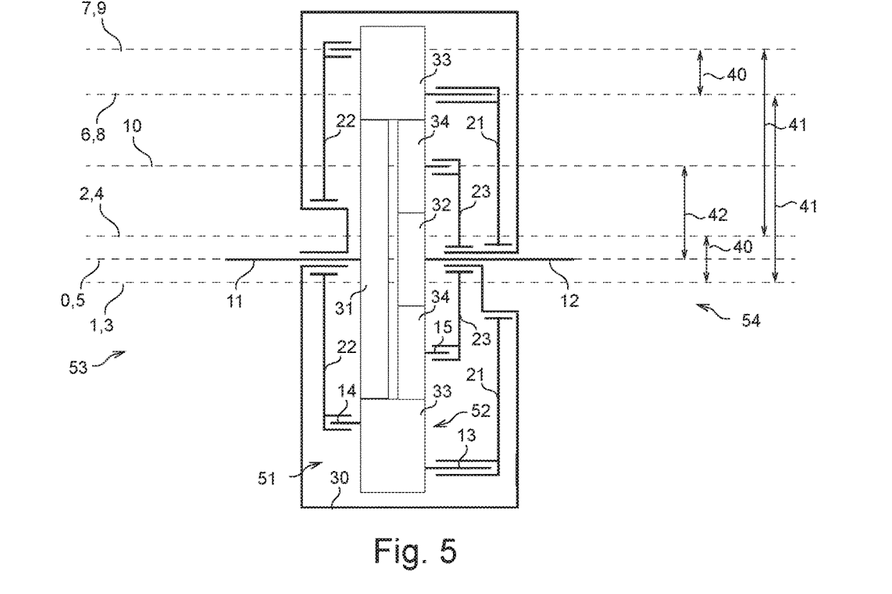
FIG. 5 is a schematic side view in accordance with a fifth exemplary embodiment depicting the present invention comprising three non-co-axial carriers.

FIG. 5 illustrates a fifth exemplary embodiment of the present invention which is similar to the first exemplary embodiment except it further comprises a third carrier 23 which is integral with all coupling axes 10 and comprises a third rotation axis 5. The third rotation axis 5 and the central axis 0 are co-axial and rotatably coupled, the second carrier 22 is located in front of the offset members 33, each first shaft 13 and the associated offset member 33 are non-co-axial, and the first carrier axis 1 and the central axis 0 are non-co-axial.

Figure 6:
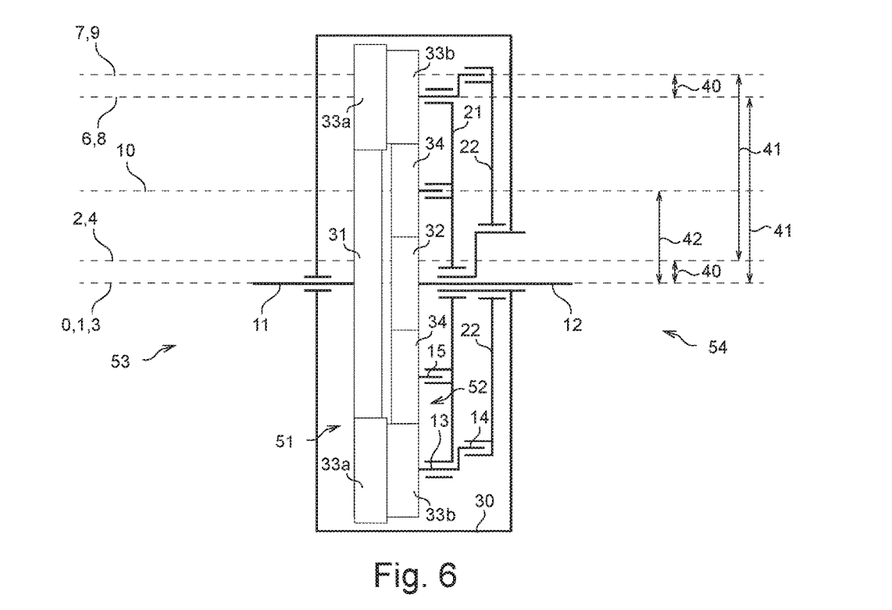
FIG. 6 is a schematic side view in accordance with a sixth exemplary embodiment depicting the present invention comprising stepped offset members.

FIG. 6 illustrates a sixth exemplary embodiment of the present invention which is similar to the first exemplary embodiment except each offset member 33 is a stepped offset member comprising a first step 33a, and a second step 33b. All first steps 33a simultaneously engage the first central member 31 and each second step 33b engages a coupling member 34.

Figure 7A:
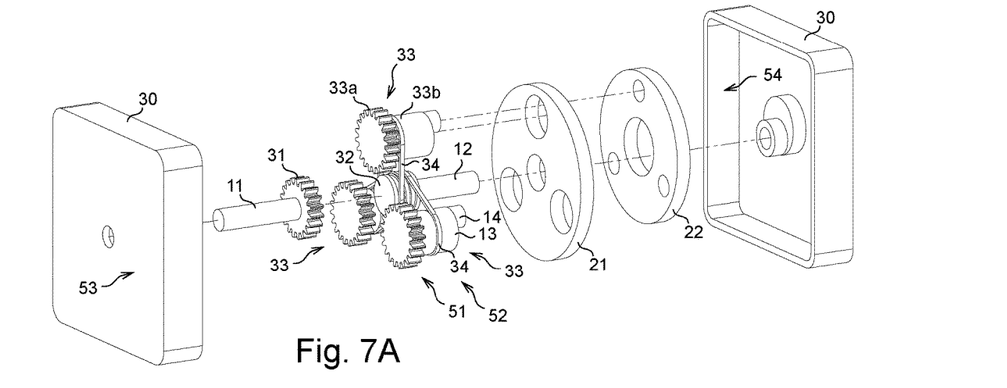
FIGS. 7A-7B are respectively, an exploded perspective view and a partial front view, in accordance with a seventh exemplary embodiment depicting the present invention comprising flexible coupling members.
Figure 7B:
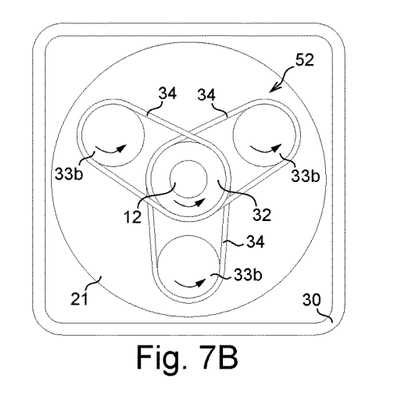
Figure 7C:
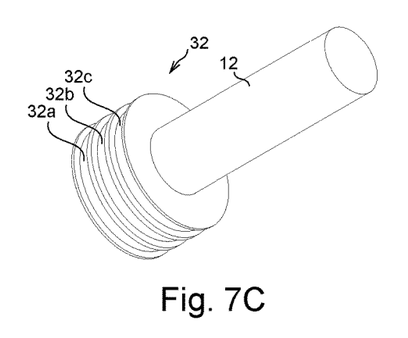
FIG. 7C is a perspective view of a stepped second central member, in accordance with the seventh exemplary embodiment of the present invention.

FIGS. 7A-7C illustrate a seventh exemplary embodiment of the present invention which is similar to the sixth exemplary embodiment except all offset members 33 are stepped offset members 33 comprising a gear first step 33a and a pulley second step 33b, all coupling members 34 are flexible coupling members 34, there are no coupling axes 10, and the second central member 32 is a stepped pulley.

FIG. 7B depicts the second stage 52 of the seventh exemplary embodiment.

FIG. 7C illustrates a detail view of the second central member 32 comprising three steps 32a-32c which each engage a different flexible coupling member 34. All steps 32a-32c have a common pitch diameter and are included to avoid mechanical interference.

Figure 8:
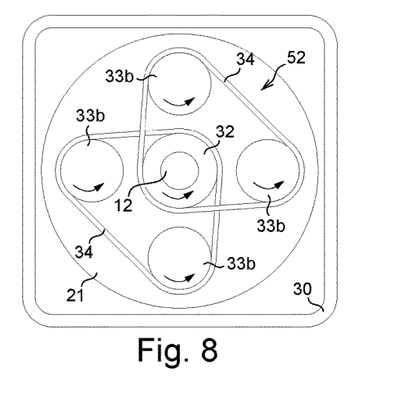
FIG. 8 is a partial front view in accordance with an eighth exemplary embodiment depicting the present invention comprising two serpentine coupling members, each engaging a pair of adjacent offset members.

FIG. 8 illustrates an eighth exemplary embodiment of the present invention which is an alternative configuration of the second stage 52 of the seventh exemplary embodiment. It comprises four offset members 33b and two serpentine coupling members 34, each simultaneously engaging the second central member 32 and two offset members 33.

Figure 9:
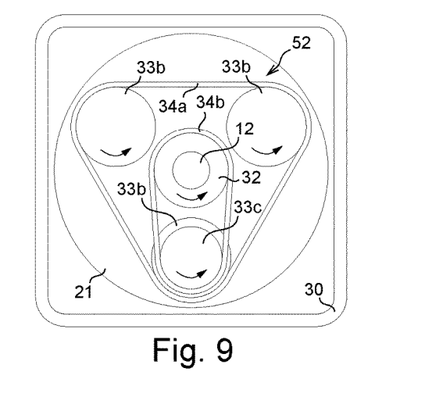
FIG. 9 is a partial front view in accordance with a ninth exemplary embodiment depicting the present invention comprising one flexible coupling member and one serpentine coupling member.

FIG. 9 illustrates a ninth exemplary embodiment of the present invention which is an alternative configuration of the second stage 52 of the seventh exemplary embodiment. It comprises three offset members 33b, one of which further comprises a third step 33c. A serpentine engaging member 34a simultaneously engages all offset member second steps 33b. A flexible engaging member 34b simultaneously engages the second central member 32 and the offset member third step 33c. Providing the second central member 32 and the offset member third step 33c with a variable pitch diameter results in an infinitely variable speed ratio.

Figure 10A:
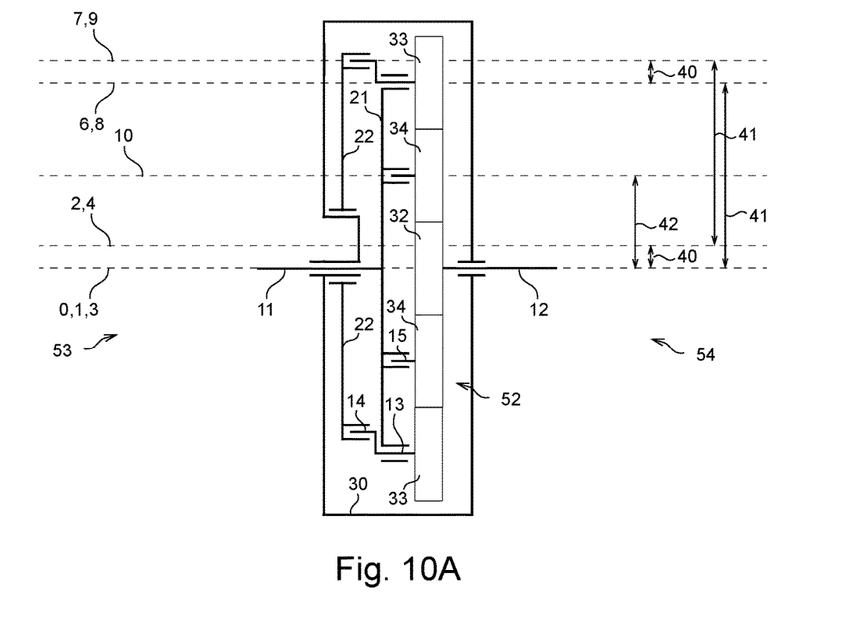
FIGS. 10A-10B are respectively, a schematic side view and an exploded perspective view in accordance with a tenth exemplary embodiment depicting the present invention comprising an integral first drive-shaft and first carrier.
Figure 10B:
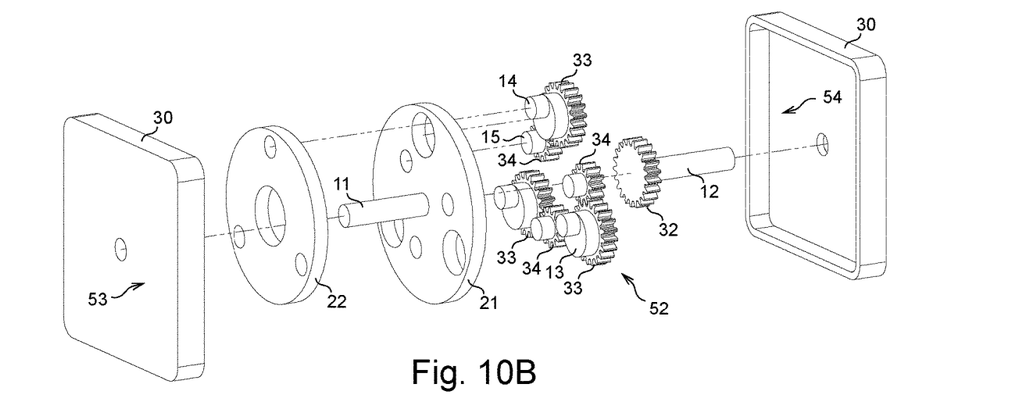

FIGS. 10A-10B illustrate a tenth exemplary embodiment of the present invention which is similar to the first exemplary embodiment except the first central member 31 is absent, the first and second carriers 21, 22 are located in front of the offset members 33, and the first drive-shaft 11 and the first carrier 21 are co-axial and integral. The absence of the first central member 31 eliminates the first stage 51 altogether, and leaves only the second stage 52, which is a Coupled Orbitless gearbox.

Figure 11:
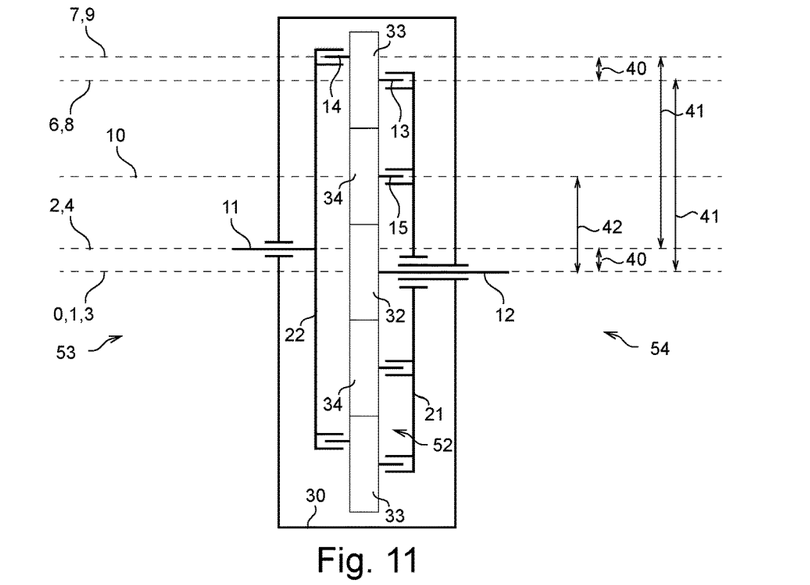
FIG. 11 is a schematic side view in accordance with an eleventh exemplary embodiment depicting the present invention comprising an integral first drive-shaft and second carrier, providing offset first and second drive-shafts.

FIG. 11 illustrates an eleventh exemplary embodiment of the present invention which is similar to the tenth exemplary embodiment except the first drive-shaft 11 and second carrier 22 are co-axial and integral. This embodiment provides offset first and second drive-shafts 11, 12.

Figure 12:
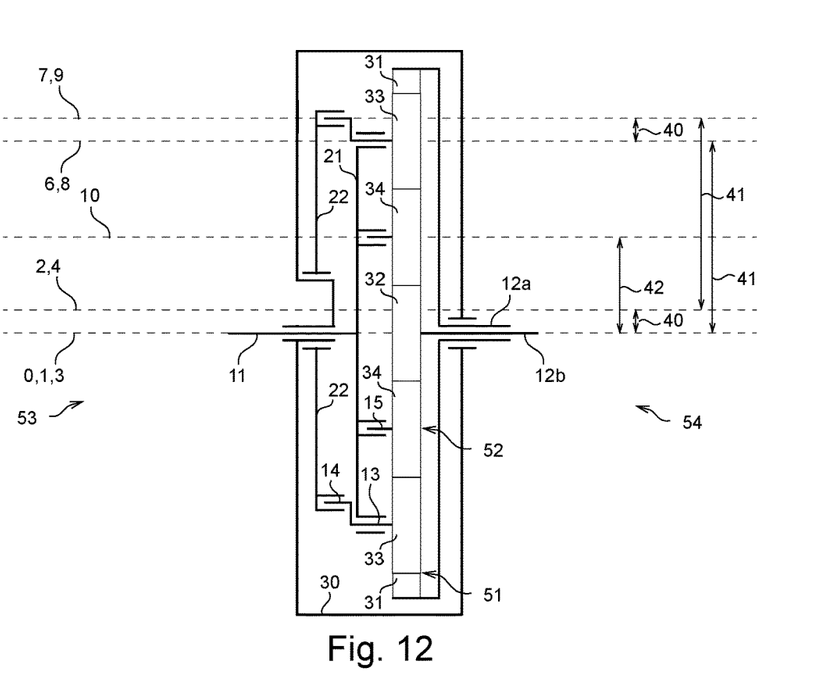
FIG. 12 is a schematic side view in accordance with a twelfth exemplary embodiment depicting the present invention comprising multiple second drive-shafts, each providing a different speed ratio.

FIG. 12 illustrates a twelfth exemplary embodiment of the present invention which is similar to the first exemplary embodiment except the first central member 31 is a ring, the first central member 31 and an additional second drive-shaft 12a are co-axial and integral, the first and second carriers 21, 22 are located in front of the offset members 33, and the first drive-shaft 11 and the first carrier 21 are co-axial and integral. The first and second stages 51, 52, each depict a Coupled Orbitless gearbox which both reside in a common plane and each comprise a second drive-shaft 12a, 12b which each deliver a different speed ratio, and together depict a 2-speed Coupled Orbitless gearbox.

EXAMPLES

As illustrated by the arrows in FIG. 1B, the first through ninth exemplary embodiments each comprise a first stage 51 comprising a first central member 31 and offset members 33 which are engaged whereby they counter-rotate with respect to the first carrier 21. Each of these exemplary embodiments depict an Orbitless first stage 51.

As illustrated by the arrows in FIGS. 1C, 2, 7B, 8 and 9, the first through twelfth exemplary embodiments each comprise a second stage 52 comprising a second central member 32 and offset members 33 which are engaged whereby they rotate in a common direction with respect to the first carrier 21. Each of these exemplary embodiments depict a Coupled Orbitless second stage 52.

In each of the examples herein, two gearbox speed ratios, R and R' are defined where $T_1$ is the number of turns of the first drive-shaft 11 and $T_2$ is the corresponding number of turns of the second drive-shaft 12, all with respect to the reference member 30.

$$R = \frac{T_1}{T_2}:1 \quad R' = \frac{1}{R}:1 = \frac{T_2}{T_1}:1$$

For each of the first and second stages 51, 52, two corresponding speed ratios, $R_1$, $R_1'$, $R_2$, and $R_2'$, are defined where $T_C$ is the number of turns of the carriers 21, 22, 23, which all rotate in unison with respect to the reference member 30.

$$R_1 = \frac{T_1}{T_C}:1 \quad R_1' = \frac{T_C}{T_1}:1 \quad R_2 = \frac{T_2}{T_C}:1 \quad R_2' = \frac{T_C}{T_2}:1$$

A Hybrid Orbitless gearbox comprising an Orbitless first stage 51 and a Coupled Orbitless second stage 52 provides the following reduction ratio:

$$R = \frac{T_1}{T_2}:1 = \frac{T_1}{T_C}\frac{T_C}{T_2}:1 = R_1 R_2':1$$

Speed ratios are computed from $P_1$, $P_2$, $P_o$, $P_a$, and $P_b$ which are the pitch diameters of the first central member 31, second central member 32, offset members 33, coupling member first steps 34a, and coupling member second steps 34b, respectively. Only stepped coupling members 34 alter the speed ratio. When an engaging member is a gear with a module of 1, the pitch diameter is equal to the number of teeth.

In each first stage 51, the first central member 31 and all offset members 33 are engaged whereby they counter-rotate and provide the following speed ratios:

$$R_1 = 1 + \frac{P_o}{P_1}:1 \quad R_1' = \frac{P_1}{P_1 + P_o}:1$$

In each second stage 52, the second central member 32 and all offset members 33 are engaged whereby they rotate in a common direction and provide the following speed ratios:

$$R_2 = 1 - \frac{P_o}{P_2}:1 \quad R_2' = \frac{P_2}{P_2 + P_o}:1$$

The following speed ratios result when the following conditions are met:
$R_2'=P_2:1 \; P_o=P_2-1$
$R_2'=-P_2:1 \; P_o=P_2+1$ The following speed ratios result when the coupling members 34 are stepped:

$$R_2 = 1 - \frac{P_o P_b}{P_2 P_a}:1 \quad R_2' = \frac{P_2 P_a}{P_2 P_a - P_o P_b}:1$$

The following speed ratios result when the following conditions are met:
$R_2'=P_2^2:1 \; P_o=P_2-1 \; P_a=P_2 \; P_b=P_2+1$
$R_2'=P_2^2:1 \; P_o=P_2+1 \; P_a=P_2 \; P_b=P_2-1$ A first example considers the first and second exemplary embodiments illustrated in FIGS. 1-2 where each coupling member 34 is a non-stepped pinion gear.

$P_1 = 27 \; P_2 = 21 \; P_o = 20$ $$R_1 = 1 + \frac{P_o}{P_1} = 1.74:1 \quad R_2' = P_2 = 21:1 \quad R = R_1 R_2' = 37:1$$

A second example considers the third exemplary embodiment illustrated in FIG. 3 where each coupling member 34 is a stepped pinion gear.

$P_1 = 25 \; P_2 = 19 \; P_o = 20 \; P_a = 19 \; P_b = 18$ $$R_1 = 1 + \frac{P_o}{P_1} = 1.8:1 \quad R_2' = P_2^2 = 361:1 \quad R = R_1 R_2' = 650:1$$

A third example considers the seventh exemplary embodiment illustrated in FIG. 7 where all engaging members in the second stage 52 are pulleys and belts. The absence of gear teeth makes a very high reduction ratio practical. Note that if $P_2=P_o$ then $R=R_2'=\infty:1$.

$$P_1 = 19 \quad P_2 = 20.1 \quad P_o = 20$$
$$R_1 = 1 + \frac{P_o}{P_1} = 2.05:1 \quad R_2' = \frac{P_2}{P_2 - P_o} = 201:1 \quad R = R_1 R_2' = 413:1$$

A fourth example considers the second stage 52 of the ninth exemplary embodiment illustrated in FIG. 9. The second central member 32 and the offset member third step 33c have a variable pitch radius defined by the ratio N. In practice, the pitch diameters of the offset member 33c and the second central member 32 may be manipulated to maintain a constant length of the flexible coupling member 34b. The variable pitch second stage 52 provides the following speed ratios:

$$R_2 = 1 - N:1 \quad R_2' = \frac{1}{1-N}:1 \quad N = \frac{P_o}{P_2}$$

When N varies from 0.5 to 1, $R_2'$ varies from 2:1 to $\infty:1$, which corresponds to a stopped second drive-shaft 12 ($T_2=0$ for any $T_c$). When N varies from 1 to 2, $R_2'$ varies from $\infty:1$ to $-1:1$ which corresponds to a direction reversal of the second drive-shaft 12.

$N=\frac{1}{2}\to 1 \quad R_2'=2:1\to\infty:1$
$N=1\to 2 \quad R_2'=\infty:1\to -1:1$ A fifth example considers the tenth and eleventh exemplary embodiments illustrated in FIGS. 10-11 which depict a Coupled Orbitless gearbox.

$P_2=21 \quad P_o=20$
$R=R_2'=P_2=21:1$

ADVANTAGES

The exemplary embodiments disclosed herein have a number of advantageous properties.

Certain exemplary embodiments comprise two gearing stages with a single set of carriers which provides low cost and complexity.

Certain exemplary embodiments provide a high speed ratio in a small volume.

Certain exemplary embodiments provide multiple speed ratios.

Certain exemplary embodiments provide an infinitely variable speed ratio.

Certain exemplary embodiments provide low pitch velocity and bearing speed which may accommodate a high input speed.

Certain exemplary embodiments comprise flexible coupling members with a high contact ratio and high torque capacity.

Certain exemplary embodiments comprise offset or co-axial drive axes.

Other advantages are apparent from the disclosure herein.

The invention claimed is:

1. An apparatus comprising:
a reference member, a first and second carrier, a second central member, one or more offset members, one or more coupling members, and a number of coupling axes equal to the number of coupling members;
the second central member and all offset and coupling members are engaging members;
the reference member comprises a central axis and a first and second carrier axis;
each carrier comprises a rotation axis and a number of offset axes equal to the number of offset members;
each offset member comprises a first and second member axis;
and wherein:
all axes are parallel;
the first and second carrier axes are spaced apart by a carrier distance;
all associated first and second member axes are spaced apart by the carrier distance;
each offset axis and the associated rotation axis are spaced apart by an offset distance;
all offset axes are arranged circumferentially around the associated rotation axis;
the second central member and the central axis are co-axial and rotatably coupled;
the first rotation axis and the first carrier axis are co-axial and rotatably coupled;
the second rotation axis and the second carrier axis are co-axial and rotatably coupled;
each first member axis and a different first offset axis are co-axial and rotatably coupled;
each second member axis and a different second offset axis are co-axial and rotatably coupled;
each coupling member and a different coupling axis are co-axial and rotatably coupled;
and the coupling axes are arranged whereby the coupling members simultaneously engage the second central member and all offset members.

2. The apparatus of claim 1 further comprising a first central member which is an engaging member which is co-axial and rotatably coupled with the central axis.

3. The apparatus of claim 2 wherein the first central member simultaneously engages all offset members.

4. The apparatus of claim 2 wherein the first central member simultaneously engages all coupling members.

5. The apparatus of claim 1 wherein each offset member is a stepped engaging member.

6. The apparatus of claim 1 wherein each coupling member is a stepped engaging member.

7. The apparatus of claim 1 wherein one of the first or second carriers and all coupling axes are integral, and the associated carrier axis and the central axis are co-axial.

8. The apparatus of claim 1 further comprising a third carrier comprising a third rotation axis, and wherein the third carrier and all coupling axes are integral, and the third rotation axis and the central axis are co-axial and rotatably coupled.

9. The apparatus of claim 1 further comprising a variable speed ratio between the second central member and the offset members.

10. An apparatus comprising:
a reference member, a first and second carrier, a first and second central member, one or more offset members, and one or more coupling members;
the first and second central members and all offset and coupling members are engaging members;
the reference member comprises a central axis and a first and second carrier axis;
each carrier comprises a rotation axis and a number of offset axes equal to the number of offset members;

each offset member comprises a first and second member axis;

and wherein:

all axes are parallel;

the first and second carrier axes are spaced apart by a carrier distance;

all associated first and second member axes are spaced apart by the carrier distance;

each offset axis and the associated rotation axis are spaced apart by an offset distance;

all offset axes are arranged circumferentially around the associated rotation axis;

the first central member and the central axis are co-axial and rotatably coupled;

the second central member and the central axis are co-axial and rotatably coupled;

the first rotation axis and the first carrier axis are co-axial and rotatably coupled;

the second rotation axis and the second carrier axis are co-axial and rotatably coupled;

each first member axis and a different first offset axis are co-axial and rotatably coupled;

each second member axis and a different second offset axis are co-axial and rotatably coupled;

the first central member simultaneously engages all offset members;

and the coupling members simultaneously engage the second central member and all offset members.

11. The apparatus of claim 10 wherein each offset member is a stepped engaging member.

12. The apparatus of claim 10 further comprising a variable speed ratio between the second central member and the offset members.

13. A method comprising:

providing a reference member, a first and second carrier, a first and second central member, one or more offset members, and one or more coupling members;

providing the first and second central members and all offset and coupling members with an engaging means;

providing the reference member with a central axis and a first and second carrier axis;

providing each carrier with a rotation axis and a number of offset axes equal to the number of offset members;

providing each offset member with a first and second member axis;

locating all axes whereby they are all parallel;

spacing the first and second carrier axes apart by a carrier distance;

spacing all associated first and second member axes apart by the carrier distance;

spacing each offset axis and the associated rotation axis apart by an offset distance;

arranging all offset axes circumferentially around the associated rotation axis;

co-axially locating and rotatably coupling the first central member and the central axis;

co-axially locating and rotatably coupling the second central member and the central axis;

co-axially locating and rotatably coupling the first rotation axis and first carrier axis;

co-axially locating and rotatably coupling the second rotation axis and second carrier axis;

co-axially locating and rotatably coupling each first member axis and a different first offset axis;

co-axially locating and rotatably coupling each second member axis and a different second offset axis;

and simultaneously engaging the coupling members with the second central member and all offset members.

14. The method of claim 13 simultaneously engaging the first central member and all offset members.

15. The method of claim 13 simultaneously engaging the first central member and all coupling members.

16. The method of claim 13 further providing each offset member with a first engaging step and a second engaging step.

17. The method of claim 13 further providing each coupling member with a first engaging step and a second engaging step.

18. The method of claim 13 further providing one of the first or second carriers with a number of coupling axes equal to the number of coupling members, co-axially locating and rotatably coupling each coupling member and a different coupling axis, and co-axially locating the associated carrier axis and the central axis.

19. The method of claim 13 further providing a third carrier, providing the third carrier with a third rotation axis and a number of coupling axes equal to the number of coupling members, co-axially locating and rotatably coupling each coupling member and a different coupling axis, and co-axially locating and rotatably coupling the third rotation axis and the central axis.

20. The method of claim 13 further providing a variable speed ratio between the second central member and the offset members.

* * * * *